United States Patent
Vila Anton

(10) Patent No.: US 11,896,964 B2
(45) Date of Patent: Feb. 13, 2024

(54) POLYCRYSTALLINE DIAMOND CONSTRUCTION AND METHOD OF MAKING SAME

(71) Applicant: ELEMENT SIX (UK) LIMITED, Didcot (GB)

(72) Inventor: Rafael Vila Anton, Didcot (GB)

(73) Assignee: Element Six (UK) Limited, Didcot (GB)

(*) Notice: Subject to any disclaimer, the term of this patent is extended or adjusted under 35 U.S.C. 154(b) by 785 days.

(21) Appl. No.: 16/705,560

(22) Filed: Dec. 6, 2019

(65) Prior Publication Data
US 2020/0179888 A1 Jun. 11, 2020

(30) Foreign Application Priority Data
Dec. 6, 2018 (GB) ...................................... 1819946

(51) Int. Cl.
| | |
|---|---|
| *B01J 3/06* | (2006.01) |
| *B01J 23/34* | (2006.01) |
| *B01J 23/72* | (2006.01) |
| *B01J 23/755* | (2006.01) |
| *B01J 23/75* | (2006.01) |
| *C01B 32/26* | (2017.01) |

(52) U.S. Cl.
CPC ............... *B01J 3/065* (2013.01); *B01J 23/34* (2013.01); *B01J 23/72* (2013.01); *B01J 23/75* (2013.01); *B01J 23/755* (2013.01); *B01J 2203/0605* (2013.01); *B01J 2203/0655* (2013.01); *B01J 2203/0685* (2013.01); *C01B 32/26* (2017.08)

(58) Field of Classification Search
None
See application file for complete search history.

(56) References Cited

U.S. PATENT DOCUMENTS 7,842,111 B1 * 11/2010 Sani ........................ C01B 32/26
51/307

FOREIGN PATENT DOCUMENTS

| | | |
|---|---|---|
| CN | 103060771 A | 4/2013 |
| EP | 1144719 A2 | 10/2001 |
| EP | 1662021 A2 | 5/2006 |
| GB | 2543032 A | 4/2017 |
| JP | H04139292 A | 5/1992 |
| JP | H05221792 A | 8/1993 |

(Continued)

OTHER PUBLICATIONS

Yu et al.; Effect of Crystal Structure on the Behavior of Diamond Electrodes: Electrochemical Characteristics of Individual Crystal Faces; Journal of The Electrochemical Society, 149 (7) E260-E264; 2002.*

(Continued)

*Primary Examiner* — Guinever S Gregorio
(74) *Attorney, Agent, or Firm* — Kilpatrick Townsend & Stockton LLP

(57) ABSTRACT

A polycrystalline diamond construction comprising a body of polycrystalline diamond material formed of a mass of diamond grains exhibiting inter-granular bonding, wherein between around 50 wt % to around 99 wt % of the diamond grains in a cross-section of the body of polycrystalline diamond material taken at any orientation have a sectorial growth structure. A method of making the polycrystalline diamond construction is also disclosed.

7 Claims, 3 Drawing Sheets

(56) References Cited

FOREIGN PATENT DOCUMENTS

JP        2009242214 A    10/2009
WO       2015135979 A1    9/2015

OTHER PUBLICATIONS

Irifune et al.; Formation of Pure Polycrystalline Diamond by Direct Conversion of Graphite at High Pressure and High Temperature; Physics of the Earth and Planetary Interiors; 143-144, 593-600; 2004.*
Chen CN114086252A translation Dec. 6, 2022.*
Chen CN114086252A drawings Dec. 6, 2022.*
Wang et al., "Evaluation of boron-doped-microcrystalline/nanocrystalline diamond composite coatings in drilling of CFRP", Surface & Coatings Technology, Jul. 4, 2017, pp. 149-162, vol. 330, Elsevier B.V.
Rudolph, "Handbook of Crystal Growth", "Bulk Crystal Growth". Chapter 1.3: Crystal Growth in Geology: Deciphering Geological Information from Crystal morphology, 2nd Edition, 2015.
Mitchell, "8th International Kimberlite Conference: The J.Barry Hawthorne volume", pp. 262-263, figure K-5.
Strekeisen, "Zoning", https://web.archive.org/web/20181026001108/http://www.alexstrekeisen.it/english/vulc/zoning/php, Believed to be published at least as early as 2018.
United Kingdom Patent Application No. GB1819946.3, Combined Search and Examination Report dated Jun. 28, 2019, 9 pages.

* cited by examiner

POLYCRYSTALLINE DIAMOND CONSTRUCTION AND METHOD OF MAKING SAME

CROSS-REFERENCE TO RELATED APPLICATION

This disclosure is related to and claims the benefit of priority of United Kingdom Application No. GB1819946.3, filed on Dec. 6, 2018, and titled "A Polycrystalline Diamond Construction and Method of Making Same", which is hereby incorporated in its entirety by this reference.

FIELD

This disclosure relates to polycrystalline diamond (PCD) constructions and methods of making such constructions, particularly but not exclusively to constructions comprising polycrystalline diamond (PCD) structures for use, for example, in heat spreader applications.

BACKGROUND

The semiconductor industry in particular has invested considerable effort in attempting to improve the cooling of high performance electronic devices. Also, as power densities have continued to increase, there is a need for more efficient and cost effective materials to remove heat from integrated circuits in such electronic devices.

Polycrystalline diamond material which has been sintered at high pressure and high temperature (HPHT) is a suitable material for such heat spreader applications as diamond has a high thermal conductivity and a very high electrical resistance. Diamond also has a low coefficient of thermal expansion allowing it to be bonded directly to a silicon integrated circuit and it is thermally isotropic in both single and polycrystalline high pressure high temperature synthesized forms.

Polycrystalline diamond (PCD) is an example of a superhard material comprising a mass of substantially inter-grown diamond grains, forming a skeletal mass defining interstices between the diamond grains. Conventional PCD material typically comprises at least about 80 volume % of diamond and is typically made by subjecting an aggregated mass of diamond particles to a high pressure of greater than about 5 GPa, typically about 5.5 GPa and a high temperature of at least about 1,200° C., for example about 1440° C., typically in the presence of a sintering aid such as cobalt, which promotes the inter-growth of diamond grains. Suitable sintering aids for PCD are also commonly referred to as solvent-catalyst materials for diamond, due to their function of dissolving, to some extent, the diamond and catalysing its re-precipitation. A solvent-catalyst for diamond is understood be a material that is capable of promoting the growth of diamond or the direct diamond-to-diamond inter-growth between diamond grains at a pressure and temperature condition at which diamond is thermodynamically stable. The intergrown diamond structure of conventional PCD material therefore comprises original diamond grains as well as a newly precipitated or re-grown diamond phase, which bridges the original grains. In the final sintered structure, catalyst/solvent material generally remains present within at least some of the interstices that exist between the sintered diamond grains.

Catalyst materials for diamond typically include any Group VIII element and common examples are cobalt, iron, nickel and certain alloys, including alloys of any of these elements. Materials that do not promote substantial coherent intergrowth between the diamond grains may themselves form strong bonds with diamond grains, but are not suitable solvent-catalysts for PCD sintering. A metal-solvent catalyst may be mixed with diamond particles prior to subjecting the diamond particles and substrate to the HPHT process.

The production of conventional PCD typically involves two HPHT pressing stages. In the first stage, the diamond grit is obtained, crushed into a micron powder and then graded according to average diamond grain size. The second stage is to form the polycrystalline diamond material by sintering the diamond grit with a solvent catalyst material at HPHT, as described above. Whilst this process provides a material with excellent mechanical properties, it is an expensive and time-consuming process. The initial application of pressure and temperature also leads to crushing of the diamond particles and a reduction in grain size, and significant plastic deformation, hence to a reduction in thermal conductivity.

There is therefore a need for a polycrystalline diamond material with a coarse grain size and minimal plastic deformation that has a thermal conductivity of around 500 W/m/K or more and a method of producing such a material by a cost-effective and less time-consuming process than that typically required to produce conventional PCD material.

SUMMARY

Viewed from a first aspect there is provided a polycrystalline diamond construction comprising:

a body of polycrystalline diamond material formed of a mass of diamond grains exhibiting inter-granular bonding, wherein between around 50 wt % to around 99 wt % of the diamond grains in a cross-section of the body of polycrystalline diamond material taken at any orientation have a sectorial growth structure.

Viewed from a second aspect there is provided a method for making a polycrystalline diamond (PCD) construction, the method comprising:

mixing a mass of diamond seed particles with a mass of graphite powder to form a pre-sinter mixture, wherein:
the mass of diamond particles comprises less than 10 wt % of the mixture;
the mass of graphite powder comprises between around 40 wt % to around 94 wt % of the mixture;
forming a pre-sinter assembly by placing the mixture into a capsule; and
subjecting the pre-sinter assembly in the presence of a catalyst/solvent material for the diamond to an ultrahigh pressure of at least around 5 GPa and a temperature of between around 1300 degrees C. and around 1700 degrees C. to sinter together the diamond grains and form the PCD construction; the diamond grains exhibiting inter-granular bonding and between around 50 wt % to around 99 wt % of the diamond grains in a cross-section of the PCD construction taken at any orientation have a sectorial growth structure.

BRIEF DESCRIPTION OF THE DRAWINGS

Various aspects will now be described by way of example and with reference to the accompanying drawings in which.

DETAILED DESCRIPTION

As used herein, a "superhard material" is a material having a Vickers hardness of at least about 28 GPa. Diamond and cubic boron nitride (cBN) material are examples of superhard materials.

As used herein, a "superhard construction" means a construction comprising a body of polycrystalline superhard material.

As used herein, conventional polycrystalline diamond (PCD) is a type of polycrystalline superhard (PCS) material comprising a mass of diamond grains, a substantial portion of which are directly inter-bonded with each other and in which the content of diamond is at least about 80 volume percent of the material. Interstices between the diamond grains may be at least partly filled with a binder material comprising a catalyst for diamond. As used herein, "interstices" or "interstitial regions" are regions between the diamond grains of PCD material. A "catalyst material" for a superhard material is capable of promoting the growth or sintering of the superhard material.

Figure 1:
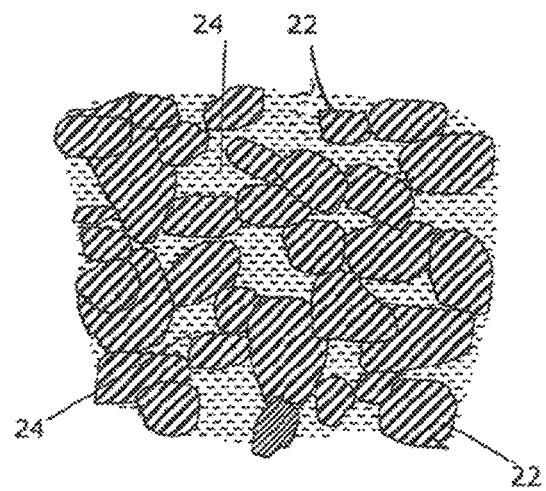
FIG. 1 is a schematic cross-section view of a portion of a conventional polycrystalline diamond (PCD) structure.

Conventional polycrystalline diamond materials (PCD) as considered in this disclosure consist of an intergrown network of diamond grains with an interpenetrating metallic network. This is illustrated schematically in FIG. 1 which shows the microstructure of conventional PCD material comprising the intergrown network of diamond grains 22 with an inter-penetrating metallic network 24. Newly crystallized diamond bonds the diamond grains 22. The network of diamond grains 22 is formed by sintering of diamond powders facilitated by molten metal catalyst/solvent for carbon at elevated pressures and temperatures. The diamond powders may have a monomodal size distribution whereby there is a single maximum in the particle number or mass size distribution, which leads to a monomodal grain size distribution in the diamond network. Alternatively, the diamond powders may have a multimodal size distribution where there are two or more maxima in the particle number or mass size distribution, which leads to a multimodal grain size distribution in the diamond network. Typical pressures used in this process are in the range of around 4 to 7 GPa but higher pressures up to 10 GPa or more are also practically accessible and can be used. The temperatures employed are above the melting point at such pressures of the metals. The metallic network is the result of the molten metal solidifying on return to normal room conditions. In principle, any molten metal solvent for carbon which can enable diamond crystallization at such conditions may be employed. The transition metals of the periodic table and their alloys may be included in such metals. As shown in FIG. 1, during formation of a conventional polycrystalline composite construction, the diamond grains 22 are directly interbonded to adjacent grains and the interstices 24 between the diamond grains 22 may be at least partly filled with the non-super hard phase material. This non-super hard phase material may comprise residual catalyst/binder material, for example cobalt, nickel or iron. The typical average grain size of the diamond grains 22 in conventional PCD is larger than 1 micron and the grain boundaries between adjacent grains is therefore typically between micron-sized diamond grains, as shown in FIG. 1.

Figure 2:
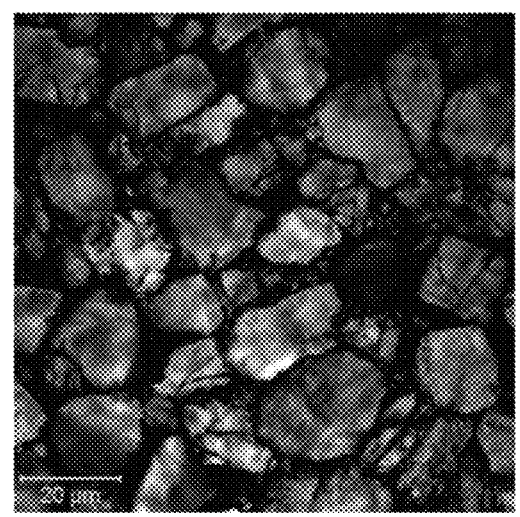
FIG. 2 is a section through conventional polycrystalline diamond material taken using a laser scanning confocal microscope with the capability of detecting fluorescence in appropriate bands.

FIG. 2 further shows the microstructure of conventionally sintered PCD material. A flat sample section was been prepared, lapped and/or polished. The surface of the section was examined using a laser scanning confocal microscope with the capability of detecting fluorescence in appropriate bands. The laser emitted at 555 nm and the image was collected using a 560 nm low pass filter. The section was examined at sufficient resolution so that the proportion of particles or grains exhibiting interbonding was clearly visible and an image obtained as shown in FIG. 2.

The sample analysed in FIG. 2 was formed using conventional PCD sintering techniques such as the method disclosed, for example, in PCT application publication number WO2009/128034. In particular, after an amount of diamond particles had been obtained and graded, a pre-sinter assembly of diamond particles admixed with an amount of solvent/catalyst binder material were loaded into a synthesis capsule and placed in a press. The catalyst material was in the form of a metal binder and in this instance was around 3 wt % cobalt, the remainder of the pre-synthesis mixture comprising the diamond particles. A powder blend comprising the diamond particles and the binder material, was prepared by combining these particles and blending them together. An effective powder preparation technology may be used to blend the powders, such as wet or dry multi-directional mixing, planetary ball milling and high shear mixing with a homogenizer. The pre-sinter assembly was then subjected to an ultra-high pressure and a temperature at which the diamond material is thermodynamically stable to sinter the diamond grains. The pressure to which the assembly was subjected was at least about 5 GPa and the temperature was at least about 1,300 degrees centigrade.

After sintering, the polycrystalline diamond construction was ground to size, sectioned and polished.

As will be seen from FIG. 2, the sintering process for conventional PCD material is based on a substantially pre-existing diamond source of diamond particles forming around 97 wt % of the pre-sinter mixture, admixed with 3 wt % solvent catalyst and, during the sintering process, results in the dissolution and re-precipitation of diamond at the particle contact points and boundaries. The resulting PCD material has specific mechanical properties such as abrasion resistance and impact resistance as it is typically used in cutting applications for example as cutters inserted into drill bits for use in the oil and gas drilling industry.

The types of materials suitable for use in non-cutting applications such as heat spreader applications do not typically require the extreme mechanical properties of conventional PCD material but it has been appreciated that a diamond-containing material could provide high thermal conductivity, and a lower coefficient of thermal expansion than conventionally used materials for these applications such as copper or aluminium nitride.

Figure 3:
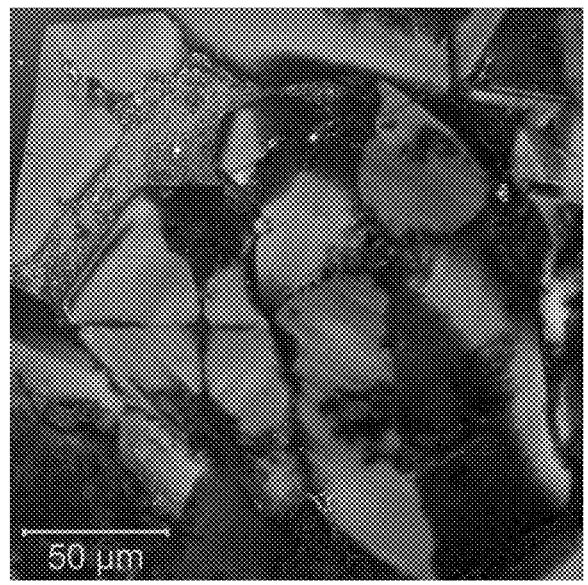
FIG. 3 is a section through an example polycrystalline diamond construction taken using a laser scanning confocal microscope with the capability of detecting fluorescence in appropriate bands.
Figure 4:
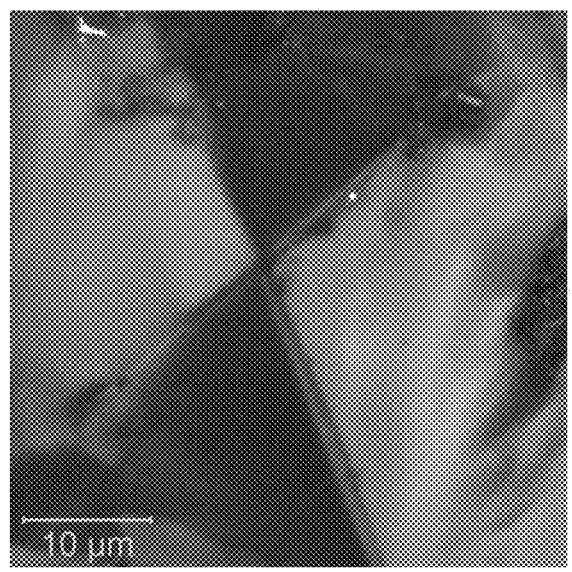
FIG. 4 is a section through a further example polycrystalline diamond construction taken using a laser scanning confocal microscope with the capability of detecting fluorescence in appropriate bands.
Figure 5:
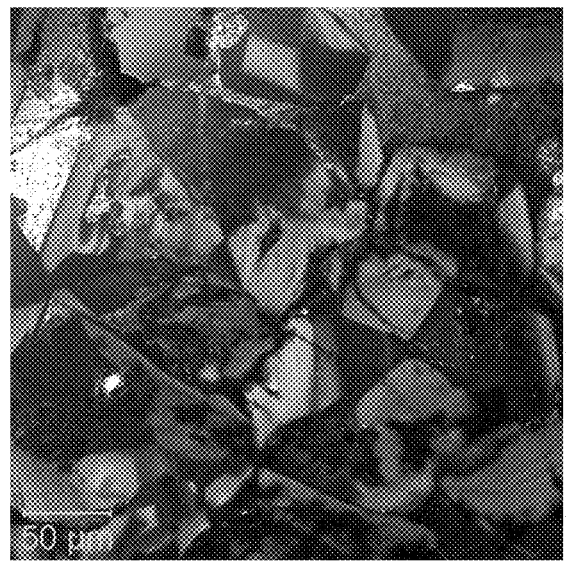
FIG. 5 is a section through a yet further example polycrystalline diamond construction taken using a laser scanning confocal microscope with the capability of detecting fluorescence in appropriate bands.

Various examples of polycrystalline constructions containing diamond are shown in FIGS. 3 to 5. It will be seen that the microstructures of these example constructions differ from the microstructure of conventionally sintered PCD material (shown in FIG. 2) in that in conventional PCD material, the majority of diamond grains in the sintered product are formed of the original pre-sinter diamond particles that have intergrown during sintering, whereas in the examples of FIGS. 3 to 5, the material is formed predominantly of newly precipitated and grown diamond particles evidenced by the growth sector structure of the diamond grains in the samples. The samples of FIGS. 3 to 5 were flat sample sections that had been prepared and polished. The surface of the sections was examined using a laser scanning confocal microscope with the capability of detecting fluorescence in appropriate bands. The laser emitted at 555 nm and the images were collected using a 490 to 555 nm bandpass filter. The sections were examined at sufficient resolution so that the proportion of particles or grains exhibiting a fully formed sectorial growth structure may be determined. This may be based on a count of such particles as a proportion of all the particles examined.

The superhard constructions of the examples shown in FIGS. 3 to 5 may be fabricated, for example, as follows. The following method is provided by way of illustration only and is intended to be non-limiting.

As used herein, a "green body" is a body comprising grains and/or particles to be sintered.

A green body for each of the samples shown in FIGS. 3 to 5 may be prepared by mixing grains or particles of diamond material, an amount of graphite powder and an amount of solvent catalyst for the diamond material. In these examples, around 20 wt % of the solvent catalyst material (in these examples a nickel-iron mixture in which the ratio of Ni:Fe was 30:70), and around 1 wt % of diamond particles having an average grain size of around 75 microns were blended in dry conditions at room temperature in a Turbula™ mixer. Around 79 wt % graphite S9 powder was then admixed with the bended diamond and catalyst material in the Turbula™ mixer, again in dry conditions at room temperature to form an admixed mixture.

The admixed mixture was then loaded into a capsule for an ultra-high pressure furnace, as is known in the art. In particular, the mixture, in powder form, was placed inside a metal cup formed, for example, of niobium. The capsule was then loaded into a press and the green body encapsulated therein subjected an ultra-high pressure and a temperature at which the diamond material is thermodynamically stable. The assembly was subjected to at least about 5 GPa and the temperature was at least about 1,300 degrees C. In some examples, the pressure to which the assembly may be subjected is around 5.5-6 GPa, but in some examples it may be up to around 7.7 GPa or greater. Also, in some examples, the temperature used in the sintering process may be in the range of around 1300 to around 1700 degrees C. As the sintering process for the examples is effectively a diamond growth process, it is believed possible that any temperature condition at which the chosen solvent metal catalyst or mixture of metals is molten, and the corresponding pressure is in the diamond stable region of PT space may be suitable. In some examples, the HPHT conditions are applied for around 10 to 20 minutes, but in other examples, the conditions may be applied for a couple of minutes to an hour or more.

After sintering, the polycrystalline super hard constructions are removed from the capsules and may be ground to size for analysis and/or sized for the desired end application.

The microstructures of the samples of various example constructions made according to the above-described method were analysed using a laser scanning confocal microscope with the capability of detecting fluorescence in appropriate bands. The laser emitted at 555 nm and the images were collected using a 490 to 555 nm bandpass filter. The sections were examined at sufficient resolution so that the proportion of particles or grains exhibiting a fully formed sectorial growth structure may be determined. This may be based on a count of such particles as a proportion of all the particles examined. The results for three samples are shown in FIGS. 3 to 5. It was determined that the example constructions comprised coarse, well intergrown diamond grains formed as a result of the pre-sinter graphite powder being converted during the sintering process into newly grown diamond grains around the diamond particles that were included in the pre-sinter mixture such that the composition of the construction comprises around 90 wt % newly grown diamond as evidenced by the growth sector structure of the diamond grains in the sintered PCD material.

Conventional PCD material does not typically comprise grains having such a growth sector structure, as shown in FIG. 2, but instead is based on a sintering process for a substantially pre-existing diamond source, with dissolution and re-precipitation of diamond at the particle contact points and boundaries. By contrast, the examples of FIGS. 3 to 5 effectively comprise as-grown PCD in that the diamond source for the end product is grown in situ during the sintering process by converting the graphite powder into newly precipitated diamonds that interbond during sintering with the aid of the solvent catalyst material as evidenced by their having a growth sector structure.

The thermal conductivity of the example constructions was tested using known techniques such as the laser flash or light flash method, where a short pulse of radiated energy is used to heat one side of a plane parallel sample and the resulting temperature increase on the other side of the sample is measured. it was found that the thermal conductivity was greater than around 500 W/mK and in some instances greater than around 700 W/mK. In some examples, the thermal conductivity was in the range of around 500-800 W/mK.

Additionally, the examples were further analysed and it was determined that the material of the examples was substantially free from plastic deformation, macroscopically stress-free and substantially free from dislocations. Conventional XRD and Raman analysis techniques were used to determine this and it will be seen that this is in contrast to conventionally sintered PCD material such as that shown in FIG. 2. It is well known that conventional PCD material comprises diamond grains that are characteristically plastically deformed, however the PCD of the examples has grains that retain their growth sector structure.

The growth sector structure may be identified and confirmed using conventional luminescence techniques to determine the features such as cathodoluminescence, or photoluminescence. It is also possible to determine these features using conventional SEM techniques, an imaging spectrometer, or laser confocal scanning interferometry, or even a commercially available technique looking at surface fluorescence by illuminating the sample with short wave ultra violet light which is available from the International Institute of Diamond Grading Research (IIDGR) to which the trade mark DiamondView™ has been applied.

The same techniques may be used to identify the plastic deformation, vacancies and NV centres that characterise the materials of the examples over conventional PCD microstructures.

While various versions have been described with reference to a number of examples, those skilled in the art will understand that various changes may be made and equivalents may be substituted for elements thereof and that these examples are not intended to limit the particular versions disclosed. For example, other catalysts may be used such as Co, Mn, Cu and alloys of these with other metals such as Fe. Also, in some examples, instead of forming the pre-sinter mixture by mixing the catalyst/solvent with the diamond seed particles, a pre-formed substrate of, for example cemented tungsten carbide may be used as the source of the catalyst/solvent for the diamond, the catalyst/solvent infiltrating from the substrate into the diamond mixture during the sintering process to convert the graphite into diamond grains and form the PCD construction.

Also, the particle size of the diamond particles and the percentages of the pre-sinter material may be altered to suit the desired end application, in particular, they may be tailored to suit the desired thermal properties, yields or other properties. For example, it is believed that providing diamond particles in the pre-sinter mixture having a large average grain size, such as greater than around 20 microns, or in some examples between around 75 to around 100 microns or larger, may result in a corresponding reduction in the density of grain boundaries in the bulk of the sintered material and it is believed that this may increase the thermal conductivity of the end material. However, in some examples, depending on the end application, it may be desirable for the particle size of the diamond particles in the pre-sinter mixture to be around 1 micron or less.

Therefore, the mass and the average grain size of the pre-sinter diamond particles may be tailored to control the number, and hence the size, of the diamond grains formed in the sintered end product.

In some examples, the diamond particles in the pre-sinter mixture may comprise around 1% by mass of the pre-sinter mixture, and the solvent metal may comprise between around 5 to around 30% by mass, the remainder being graphite. In other examples, the solvent metals may comprise between around 10% to around 20% by mass of the pre-sinter mixture.

As mentioned above, the quantity of diamond particles in the pre-sinter mixture may be chosen so that the desired final grain size is obtained. In some examples, the diamond particles in the pre-sinter mixture may comprise around less than 10% by mass of the pre-sinter mixture, or less than around 5% or less than or equal to around 1% of the mass of the pre-sinter mixture.

The graphite included in the pre-sinter mixture is not to be considered to be an additive, but is instead the source carbon from which the final PCD structure is grown, although a small volume of seed diamond particles are used to control the nucleation density. In the example constructions, it was found that up to around 99 wt % of the diamond in the end product was grown in situ during the sintering process, whereas in conventionally sintered PCD material the pre-existing source diamond in the pre-sinter mixture comprises the majority of the conventional diamond structure and the mixture is substantially sintered from pre-existing source diamond particles that are compacted together such that they start out being contiguous.

The PCD construction of the examples formed by the above-described methods may be considered to have the effect of producing, in a cost-effective way, a material for thermal management applications that is cheaper to produce than conventional PCD material as diamond is not a raw material but instead is grown in situ during sintering predominantly from graphite powder in a one-step diamond growth and sintering process. Furthermore, the construction formed of the example materials may be easily produced to the desired size for end application in the form of, for example, a layer suitable for subsequent to the desired shape or size.

Figure 6:
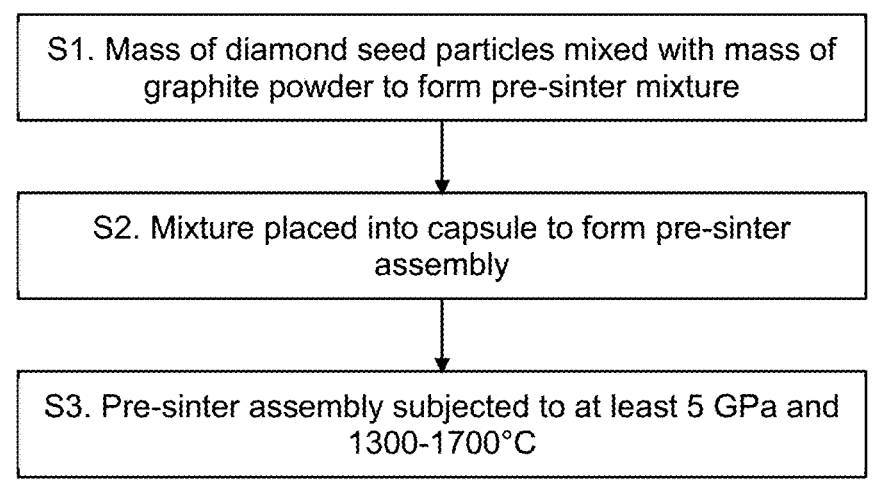
FIG. 6 is a flow diagram showing exemplary steps.

FIG. 6 shows exemplary steps for making the PCD construction, with the following numbering corresponding to that of FIG. 6:

S1. A mass of diamond seed particles is mixed with a mass of graphite powder to form a pre-sinter mixture, wherein the mass of diamond particles comprises less than 10 wt % of the mixture, and the mass of graphite powder comprises between around 40 wt % to around 94 wt % of the mixture.

S2. A pre-sinter assembly is formed by placing the mixture into a capsule.

S3. The pre-sinter assembly in the presence of a catalyst/solvent material for the diamond is subjected to an ultra-high pressure of at least around 5 GPa and a temperature of between around 1300 degrees C. and around 1700 degrees C. to sinter together the diamond grains and form the PCD construction. The diamond grains exhibit inter-granular bonding and between around 50 wt % to around 99 wt % of the diamond grains in a cross-section of the PCD construction taken at any orientation have a sectorial growth structure.

The invention claimed is:

1. A polycrystalline diamond construction comprising:
a body of polycrystalline diamond material formed of a mass of diamond grains exhibiting inter-growth and inter-granular bonding, wherein between around 50 wt % to around 99 wt % of the diamond grains in a cross-section of the body of polycrystalline diamond material taken at any orientation have a sectorial growth structure.

2. The polycrystalline diamond construction of claim 1, wherein between around 70 wt % to around 90 wt % of the diamond grains in a cross-section of the body of polycrystalline diamond material taken at any orientation have a sectorial growth structure.

3. The polycrystalline diamond construction of claim 1, wherein between around 80 wt % to around 90 wt % of the diamond grains in a cross-section of the body of polycrystalline diamond material taken at any orientation have a sectorial growth structure.

4. The polycrystalline diamond construction of claim 1, wherein the body of polycrystalline diamond material has a thermal conductivity of between 500 W/mK and 800 W/mK.

5. The polycrystalline diamond construction of claim 1, wherein the body of polycrystalline diamond material is substantially free from plastic deformation.

6. The polycrystalline diamond construction of claim 1, wherein the body of polycrystalline diamond material is substantially macroscopically stress-free.

7. The polycrystalline diamond construction of claim 1, wherein the body of polycrystalline diamond material is substantially free from dislocations.

* * * * *